UNITED STATES PATENT OFFICE.

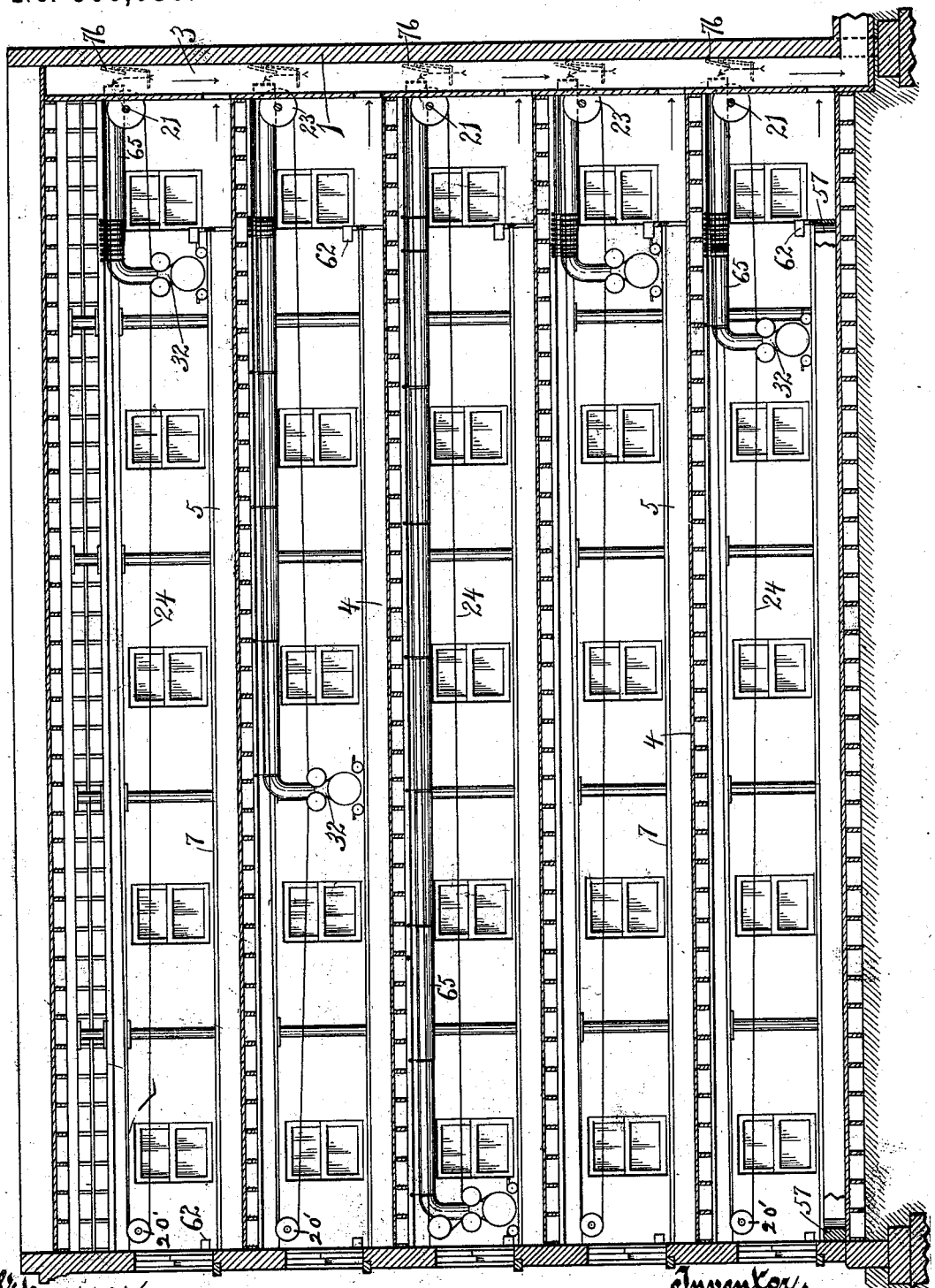

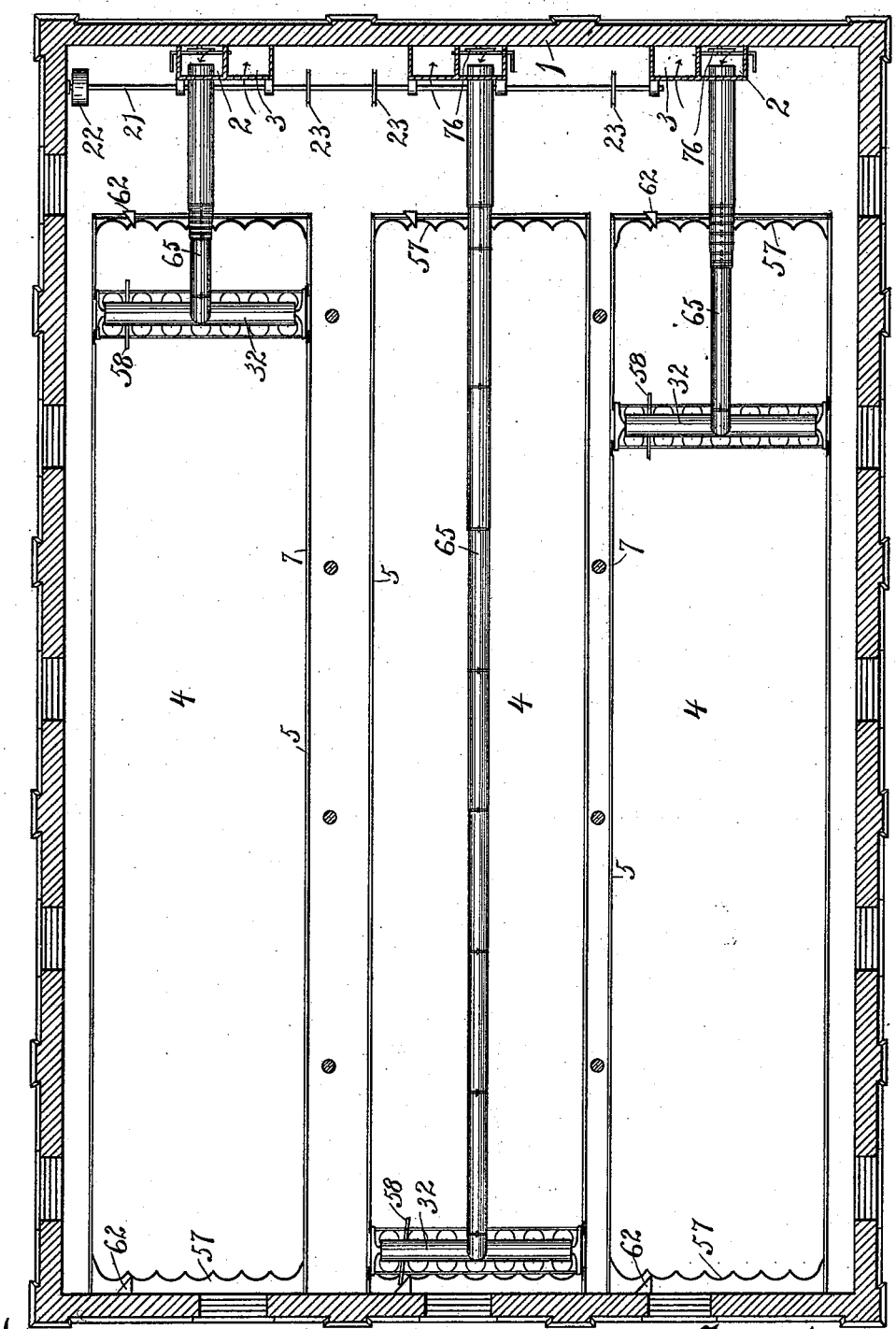

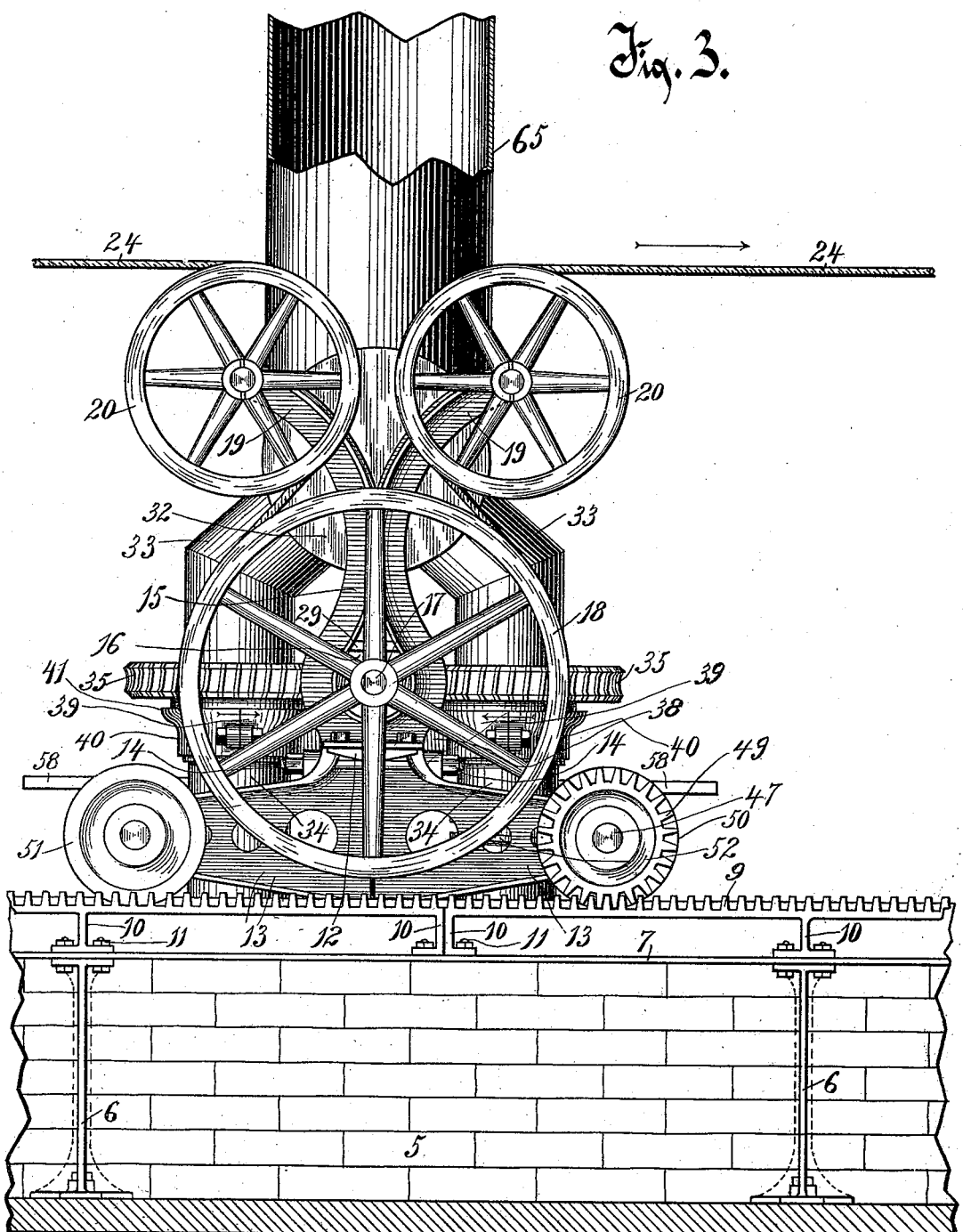

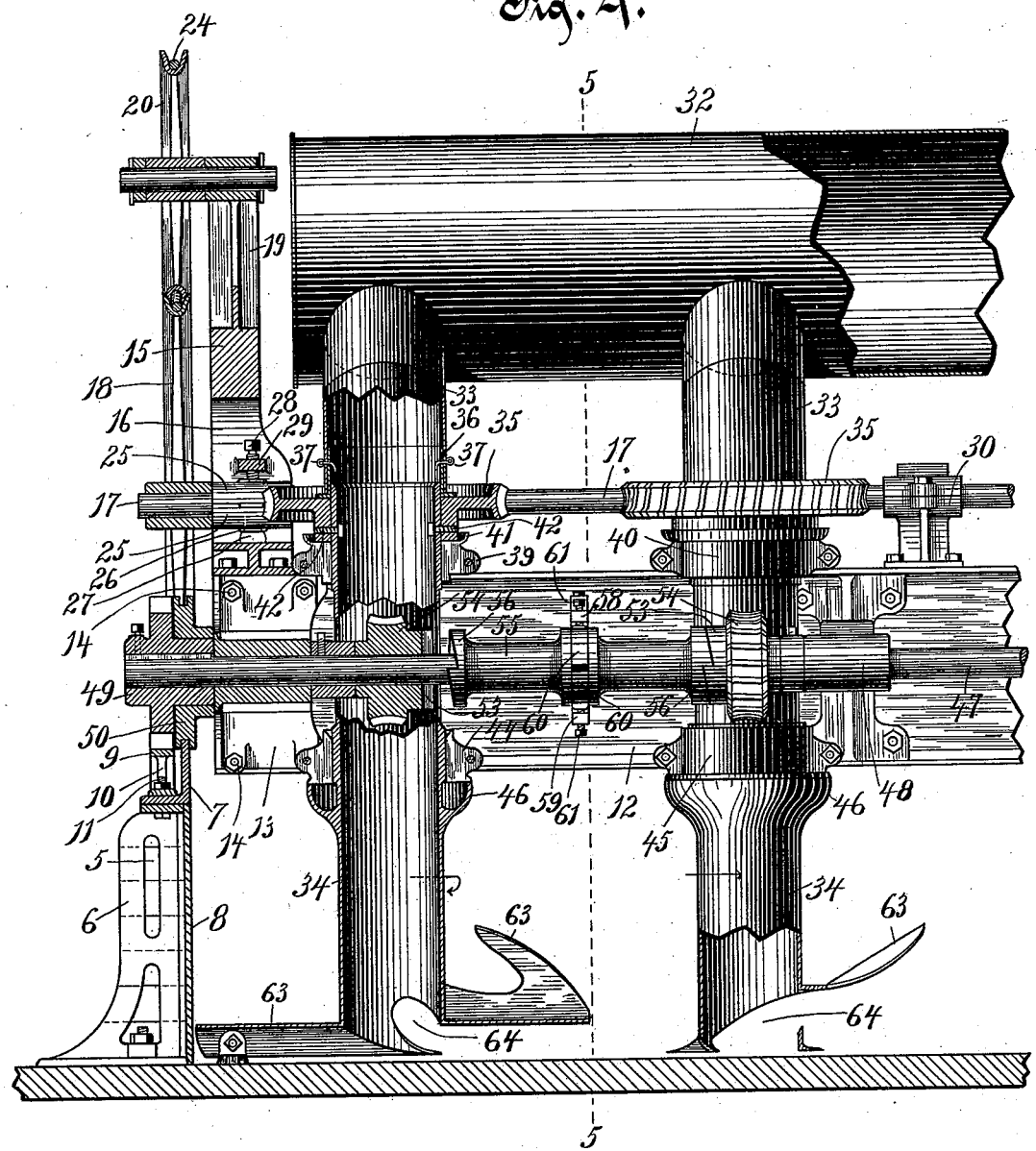

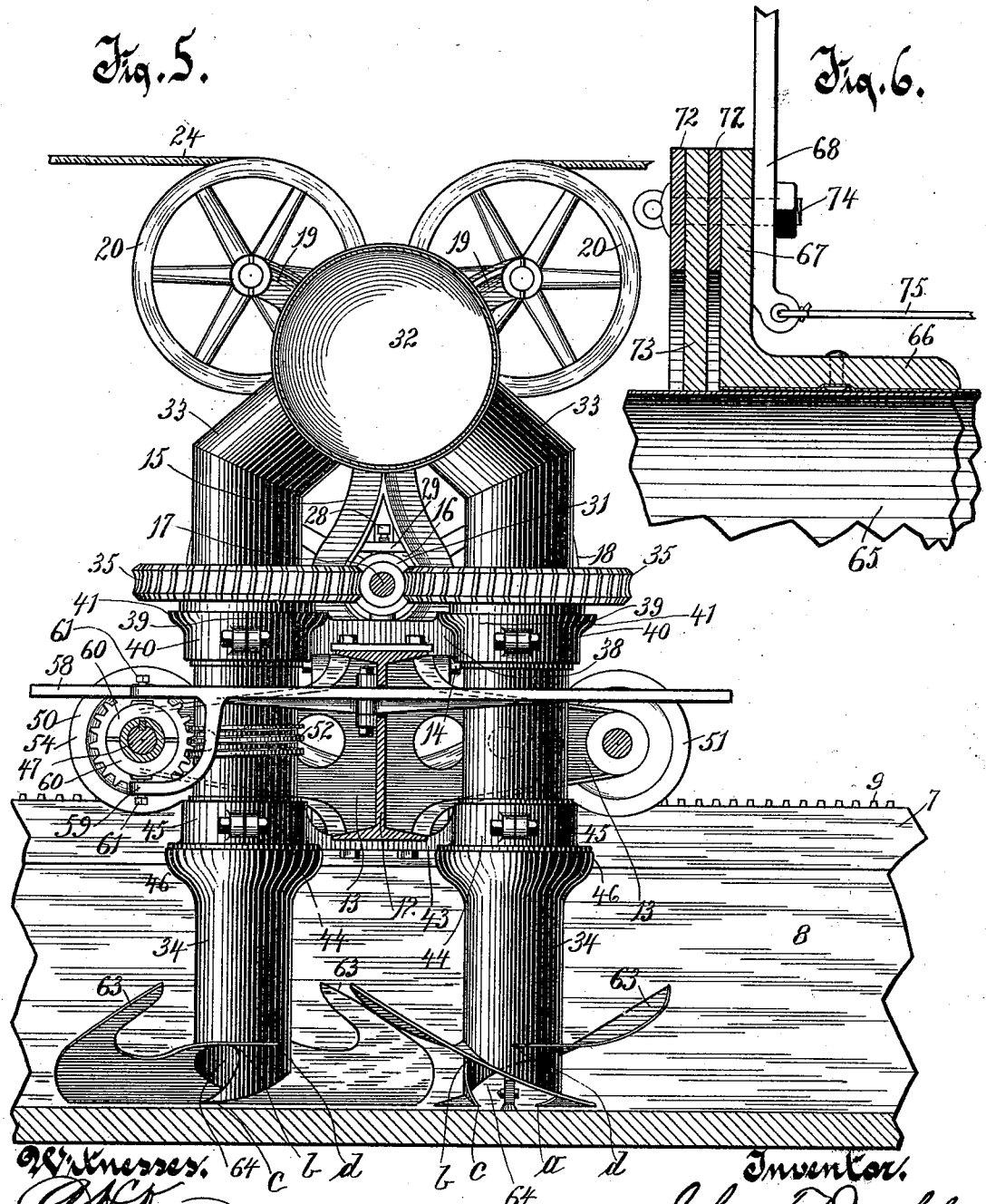

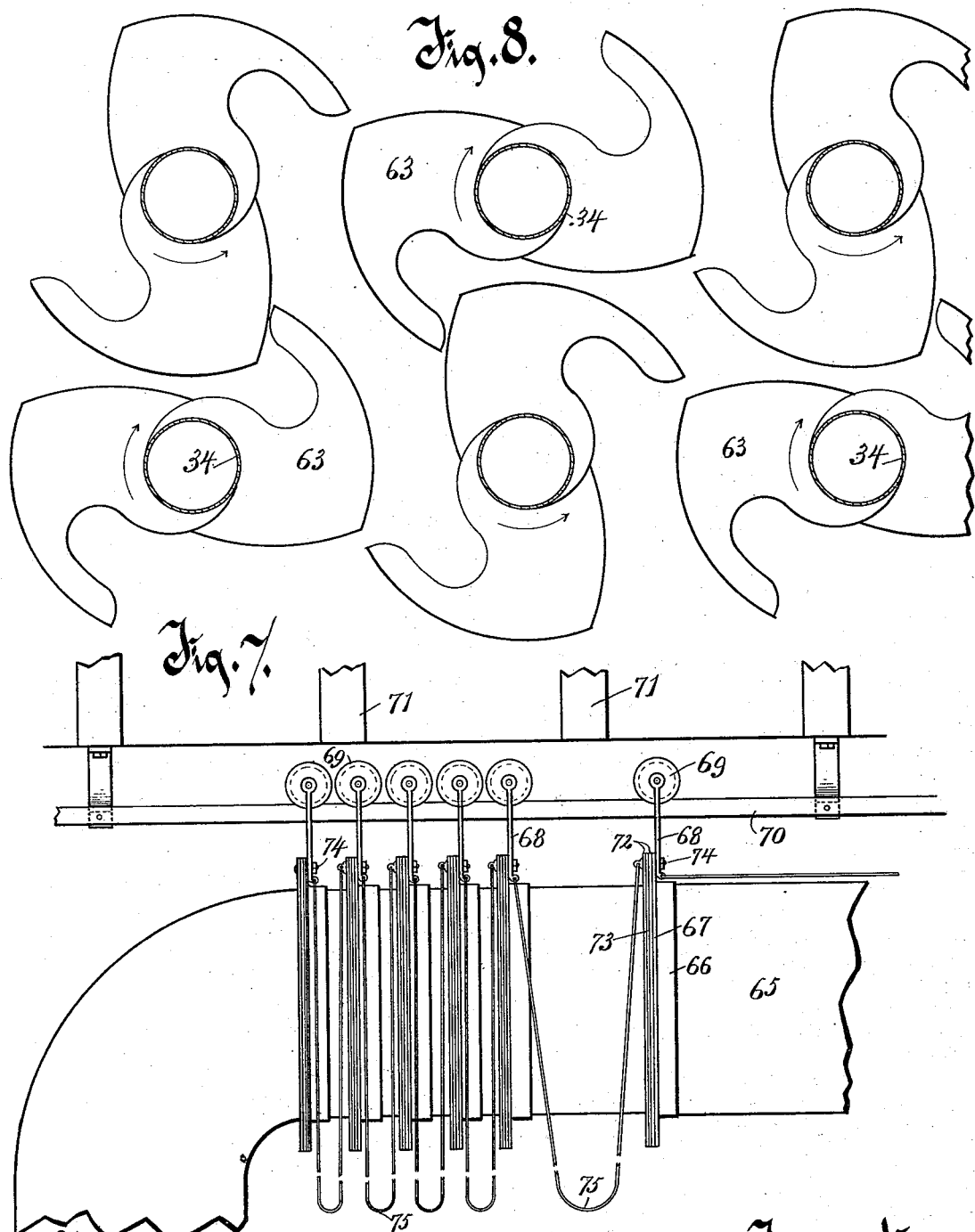

JOHN F. DORNFELD, OF WATERTOWN, WISCONSIN.

APPARATUS FOR MALTING GRAIN.

SPECIFICATION forming part of Letters Patent No. 506,036, dated October 3, 1893.

Application filed January 9, 1893. Serial No. 457,704. (No model.)

*To all whom it may concern:*

Be it known that I, JOHN F. DORNFELD, of Watertown, in the county of Jefferson and State of Wisconsin, have invented a new and useful Improvement in Apparatus for Malting Grain, of which the following is a description, reference being had to the accompanying drawings, which are a part of this specification.

My invention has relation to improvements in an apparatus for malting grain.

In the processes of malting grain, what is known as the "pneumatic" process has quite generally superseded the old and cumbersome method formerly in vogue in which the work was all required to be accomplished by manual labor.

In the various pneumatic systems now in use, several serious objections exist, as for instance, the inadaptability of such systems to the old form of malt house, thus requiring costly and special buildings to be erected for the carrying out of the same. Again, in all systems of this character of which I am aware perforated floorings are used, and as the principal desideratum in the manufacturing of good malt is cleanliness, it is obvious that this object cannot be attained when thousands of holes are required to be looked after, especially when such holes are inaccessible, as is the case in some systems. Furthermore, the old systems utilize the air in the malting room, and hence the impossibility of regulating such air as to quantity and desired temperature.

It is the object of my invention to overcome the above pointed out objections, and in accomplishing this object I use the smooth old fashioned imperforated floors as will hereinafter more fully appear, and at the same time accomplish the stirring and aerating of the germinating malt without the use of perforated false bottom floors, or perforated pipes and the like. Also, a further and important object is to so arrange in the machine a conduit for air, which will draw or press out air in any desired quantity, from the air inlet shaft, which connects with an exterior compartment in which the air is manufactured or attemperated to any desired temperature to suit the exigencies of the case, this air being transmitted to the machine and out through the malt as said machine moves and stirs the malt.

In the accompanying drawings illustrating my invention, Figure 1, is a longitudinal vertical sectional view of a malting plant. Fig. 2, is a horizontal sectional view illustrating a plan of one of the floors. Fig. 3, is a side elevation showing the manner in which the malt stirring and aerating machine is supported and travels. Fig. 4, is a front view of a portion of the malt stirring and aerating machine, parts being broken away and sectioned to more clearly illustrate the construction. Fig. 5, is a cross sectional view on the line 5—5 of Fig. 4, looking outward. Fig. 6, is a section through a fragment of the telescoping air conveying shafts, and the mechanism connected therewith. Fig. 7, is a side elevation of a fragment of the telescoping shafts and the mechanisms connected therewith, and Fig. 8, is an enlarged plan view of the malt stirring and aerating plows the tubular shafts being in section.

Like numerals and letters of reference denote like parts throughout the several views.

Referring to the drawings, the numeral 1 indicates a building or malt house, which at one end is provided with a series of vertical air shafts, arranged in pairs, each pair comprising an air inlet shaft 2, and an air outlet or exhaust shaft 3.

Each story of the building is divided longitudinally into a series of compartments 4, provided with smooth imperforated cement malting floors. The compartment walls 5, are quite low as clearly shown in Fig. 3, and are composed preferably of iron frame work with a tier of brick masoned in between. This frame work consists of cast iron supporting standards 6, bolted to the cement floor, the heads of said standards having resting thereon the horizontal portion of an L-shaped track or rail 7. The wall is plastered on the inside with cement as indicated at 8 and if desired may be similarly cemented on the outside.

The numeral 9 indicates a toothed track or rack on opposite sides of each compartment, said rack located adjacent to the track or rail 7, and upon the outer side thereof. Each of these racks is preferably made up of sections, which are provided with depending legs 10, having their lower flanged ends secured to the horizontal portion of rail 7 by bolts 11. The medial legs of this track 10, are in a line with the standards 6, and the bolts 11, serve to connect the same to the heads of said standards and the interposed horizontal portion of the L-shaped track.

A malt stirring and aerating machine, which will now be described, is constructed to travel on the tracks above described.

The numeral 12 indicates an I-beam provided at opposite ends with bracket journals 13. Each of these brackets is preferably composed of two half sections, between which the web of the I-beam passes, said half sections being secured to the web by means of bolts 14. Secured to the top of the I-beam at one end thereof, is a supplemental journal bracket 15. This bracket is provided with an opening 16, through which an operating shaft 17, passes, said shaft carrying a large peripherally grooved driven wheel 18. The upper end of this supplemental bracket is bifurcated or split to form two arms 19, 19, each affording a journal for smaller pulley wheels 20, 20.

A driving shaft 21, runs transversely of each story of the malt house, and carries a belt pulley 22, operated from any suitable source of power, through the medium of a belt, not shown. This shaft also carries a number of grooved pulleys 23, there being one of these pulleys for each compartment on a floor. Around each of the pulleys 23, runs an endless rope or cable 24, which passes over the rear pulley 20, thence down and around driven pulley 18, upward and over the forward pulley 20, and finally around a pulley 20' at the opposite end of the compartment. From this construction it will be seen that when the driving shaft 21 is actuated, rotation will be imparted to the operating shaft 17.

The boxing of the operating shaft at the end thereof where the supplemental bracket is located consists of two half sections, 25, 25, the lower formed with a socket 26, which receives a ball bearing 27, formed upon the lower bordering edge of opening 16. The upper half section is acted upon by a screw 28, passing through a threaded aperture in a transverse piece 29. The bearings for the operating shaft 17 consist of boxes similar to 30, arranged along and secured to the top of the I-beam. The shaft is also provided at suitable points along its length with worm gearing 31.

Each compartment is provided with a transverse horizontal hollow drum or cylinder 32 and extending downwardly from the cylinders is a series of cylinders 33, arranged in pairs. These cylinders extend radially for a distance and then project downward vertically, forming an obtuse angle. I have illustrated in the drawings seven of these pairs of cylinders 33, making fourteen in all to each compartment. It is to be understood, however, that I do not limit myself to this particular number as the same may be varied in accordance with the width of the compartment, or as circumstances may require.

The upper ends of hollow malt stirring shafts 34, pass into the vertical portions of cylinders 33, and are free to rotate therein. These shafts carry worm wheels 35, corresponding to and meshing with the worm gears upon the operating shaft 17, which runs between the same, so that when said operating shaft is rotated a rotation will be imparted to the malt stirring shafts, the forward and rear shafts rotating, respectively, in the directions indicated by the arrows, Fig. 3. The upper ends of the malt stirring shafts which extend into the cylinders 33, have interposed between the same and said cylinders brass rings or bushings 36, each of which is annularly flanged at its lower end, the flange extending beneath the lower end of the cylinder 33, and resting upon the top of worm wheel 35. Each ring or bushing is held in place by pins 37, 37. These rings or bushings form desirable bearings for the upper ends of the malt stirring shafts, and at the same time form practically an air tight joint or union.

Bearings are formed for each set of malt stirring shafts near their upper ends by means of arms 38, each of said arms formed upon opposite ends with half bearing boxes 39, 39, to which are bolted similar half bearing boxes 40, 40, forming complete bearings for the shafts. These bearing boxes are so constructed that when adjusted together they form at their upper edges annular oil cups or receptacles 41, 41. Upon the bottoms of these receptacles rest the hubs of the worm wheels 35, said wheels being secured to the malt stirring shafts by means of screws, 42, 42. It will thus be seen that the worm wheels are made to support the shafts in such manner that their lower ends will not contact with the floor of the compartment. Medial bearings are also formed for each set of malt stirring shafts, said bearings consisting of arms 43, bolted to the under side of the base of the I-beam, and each provided upon opposite ends with half bearing boxes 44, 44. Registering half bearing boxes 45, 45, are bolted to the other so as to form a complete bearing. The malt stirring shafts are formed immediately below these bearing boxes with oil cups or receptacles 46.

It will be observed that, from the construction just described and shown in the drawings, the upper sides of the worm wheels 35, form a cavity for the reception of oil, and this oil will serve to lubricate at the joints between the malt stirring shafts and the vertical cylinders 33. All leakage or waste of oil between the worm wheel and the malt stirring shaft will be caught by the oil receptacle or cup, 41, and thus provide a proper lubrication between the worm wheel and bearing upon which it rests. The oil escaping between this bearing and the malt stirring shaft will be finally caught by the cup 46.

The travel of the malt stirring and aerating machines is attained through the medium of a transverse shaft 47. This shaft extends through the forward sections of brackets 13, and is supported medially in bearing boxes similar to 48. This shaft carries upon opposite ends rigidly pinions 49, located outside of the brackets, said pinions meshing with or engaging the racks 9. The hub of each pinion extends inwardly a slight distance and loosely surrounding this hub is a grooved wheel 50 running upon the L-shaped track 7. It will be noticed that the teeth of the rack 9, extend a slight distance above the plane of the track 7, so as to provide, as far as possible, a uniform movement respectively, of the pinions and grooved wheels, that is to say, the teeth of the rack are made sufficiently high, so that the first or initial contact of the engaging point of the tooth of the wheel will be on a line with the upper edge of the track 7, as clearly illustrated in Figs. 3 and 4. This initial contact of each tooth of the pinion with the tooth of the rack, will of course start the rotation of the pinion, and owing to the regulation of the point of contact as above explained, the grooved wheel will start its rotation practically simultaneously. If this construction were not provided considerable retarding friction would be engendered between the grooved pulley and the hub of the pinion. The grooved wheels subserve the further function of relieving the pinions of the weight of the malt stirring and aerating machines. These pinions are only provided at the forward ends of the outer malt stirring and aerating machines, while at their rear ends said machines are supported merely upon grooved rollers or wheels 51, having their bearings in the rear sections of the brackets 13.

The forward malt stirring shafts of the two outer sets on one side, are each provided with worms 52, 52. Shaft 47 is provided with two clutch collars 53, said collars having rigid therewith worm wheels 54, 54, which mesh with the worms 52. Also splined or feathered upon the shaft intermediate the clutch collars 53, is a collar 55, provided upon opposite ends with clutches 56, 56, which, as the collar is thrown in either direction, is adapted to take into or engage the clutch of collar 53 contiguous.

It will be understood that the several worm gearings 31, upon shaft 17 are opposite or right and left, to cause the forward malt stirring shafts to rotate in an opposite direction to the rear shafts. This arrangement provides for the forward and backward movement of the malt stirring and aerating machine, inasmuch as should the innermost worm wheel 54 be thrown into engagement with the worm on the inner forward malt stirring shaft, the machine will be moved in one direction, while if thrown into engagement with the worm upon the outer forward malt stirring shaft the machine will be moved in the opposite direction. The shifting of the intermediate clutch collar 55, may be accomplished by hand, or in any other desirable manner.

The ends of the compartments 4, are closed by brick or material in an irregular form, as indicated at 57, 57, to conform to the malt stirring plows. The front end, however, is preferably made removable as shown in Fig. 2, so that the malt when the germinating process has been completed may be conveniently taken out.

Hinged to the I-beam 12, and passing through a slightly elongated slot therein, is a lever 58, which, near its forward end, is formed with a depending slightly curved arm, 59. The intermediate clutch collar 55, is provided with a central annular recess, in which fits a ring, comprising preferably two semicircular sections 60, 60. Passing through the extended forward end of hinge lever 58 and through the curved depending arm thereof are screws 61, 61, which engage the respective semicircular sections of the ring. At opposite ends of one of the compartments 4, upon one side of the floor are arranged inclined or beveled lugs 62, 62, which are adapted to engage, respectively, the opposite ends of the hinged lever 58, and the inclination is so adjusted as to throw the intermediate clutch collar 55 to a medial position between the clutch collars 53, 53, so as to be in engagement with neither. In this way, when the machine has reached its extreme forward or rearward limit of travel, rotation of transverse shaft 47 is at once stopped.

At the lower end of each shaft 34, are arranged malt stirring plows 63, 63. These plows are of the peculiar contour shown clearly in Figs. 4, 5, and 8, Fig. 5 showing the plows carried by the two shafts in different positions, one being at right angles to the other. Each malt stirring shaft at its lower end is cut out at diametrically opposite points to form openings 64, one of said openings in the shaft on the right of Fig. 5, being shown in full line, and the other opening partly in full line and partly in dotted line. The cut forming the opening shown in full line begins at the point $a$, then curves upward and around to form a bend $b$, and then down to the point $c$, while the cut forming the opposite opening would begin at a point corresponding to point $a$, and located slightly farther around in the circumferential edge of the shaft and terminating at a point corresponding to $c$, a slight distance removed or back from said point in the drawings, with a bend $b$, pointing in an opposite direction to the bend of the other opening. In other words, the opening 64, seen in full line on the right hand shaft of Fig. 5, is exactly duplicated at a diametrically opposite point of said shaft. The opening 64 seen in full line on the left hand shaft of Fig. 5, is similar in contour excepting that the points $a$ and $c$ respectively occupy reverse positions to the same points on the right hand shaft, and the bend b, points oppositely. The other opening 64 of the left hand shaft, not visible in Fig. 5, is arranged at a diametrically opposite point on the shaft, and is a duplicate of the one described, except that its bend points oppositely. One of the malt stirring plows 63, is provided for each opening of the malt stirring shaft and projects out laterally from said opening. These plows, on the right hand shaft of Fig. 5, or what would correspond to the rear shaft of a set follow the bordering edge of each opening, from the points a, to approximately the bends b, and then project circumferentially around the shaft to the points d. The same is true in regard to the plows of the shaft on the left hand of Fig. 5, excepting that it must be borne in mind that the openings in this shaft are cut oppositely to the openings of the right hand shaft, and consequently the plows would be oppositely set.

By the arrangement of the plows above explained, it will be impossible for the same to contact, inasmuch as during rotation the elevated portion of one plow always passes over the lower portion of the other.

The numeral 65 indicates an air conveying shaft, which, as clearly shown, consists of a number of telescoping sections. Each of these sections is encircled by an annular band 66, provided with an angular flange 67, said flange having secured thereto an arm 68, in the upper end of which is journaled a roller 69. A rail 70, is suspended by hangers 71, and forms a trackway for the several rollers carried by the arms 68.

The numerals 72, 72, indicate annular clamping rings between which an annular rubber ring or disk 73, is secured, said ring or disk provided with a central aperture, the bordering edge of which fits closely around the telescoping section. A common bolt 74 is employed for securing the clamping plates, flange 67 and arm 68 together. As will be seen from the drawings, these rubber disks, secured in the manner just described, are provided for each section of the telescoping air conveying shaft, and serve to make practically an air tight joint between the sections.

The arms 68 are connected in sets by ropes or cables 75. The foremost section of the telescoping air shaft projects downward and connects medially with the transverse hollow drum or cylinder 32. It is obvious, therefore, that as the malt stirring and aerating machine is moved forward, the first cable 75 is pulled taut so as to extend the first section its full length, and the remaining sections are successively extended in a similar manner. When the machine moves backward of course a reverse action takes place. A cut-off slide 76, is arranged at the end of the telescoping air conveying cylinder whereby the feed of air may be regulated.

By an ordinary form of exhaust fan, not shown, the air is drawn through the outlet or exhaust shaft 3, and a partial vacuum thus created in the malting room, and it becomes obvious that as the driving wheel is turned the machine will move along the compartment and the vertical hollow shafts caused to rotate. The plows carried by these shafts will turn and loosen up the malt, and as the cut off slide 76 in the fresh and moist air inlet shaft 2, is opened, the air is drawn along and down through the vertical hollow shaft in and under the heel of each of the malt stirring plows. Owing to the peculiar shape of these plows the malt will be elevated and then caused to fall over the edge of the plow, thus forming a wall of continuously descending malt, whereby a vacant air space is formed between the plow and the floor of the room, which permits of the fresh air passing down the pipe, then passing through the constantly descending wall of malt, and then rising up through the malt and exhausted by the suction fan. Thus, as the germinating malt is mechanically stirred it is ventilated to any desired extent, and it is also ventilated in such manner as to insure the same quantity of air alike to all places in and through the compartment. The ventilation also occurs from the floor upward, and the only obstruction, therefore, to the passage of the air is the stirred up malt itself.

The air inlet shafts 2, connect with an apartment, not shown, from which is furnished attemperated air. This apartment is not shown or described in the present application, as it is my purpose to make the same the subject of a separate application for Letters Patent. It is only mentioned herein in order to clearly illustrate the special utility and adaptability of the present device, or in other words, to show that it is intended preferably to pass or force attemperated air through the conduit or telescoping cylinder to the machine and out through the malt as said machine moves and stirs the malt. In this manner I provide a machine capable of receiving from an exterior source in any desired quantity air of a desired temperature to meet the necessary requirements for malting at all times and seasons, and feeding such air to the malt while mechanically stirred and in the process of germinating.

So far as I am aware, the invention herein shown and described is the only one capable of effecting this desirable end, and I, therefore, do not wish to be understood as restricting myself to the details of construction set forth in the description and shown on the drawings as it is obvious many of such details may be varied or changed without departing from the broad spirit and scope of my invention.

What I claim as my invention, and desire to secure by Letters Patent, is—

1. In an apparatus for malting grain, the combination of a revoluble tubular air shaft provided at its lower end with a circumferential cut or cuts, means for supplying air to said shaft, and a malting plow or plows secured to the lower end of the shaft, said plow or plows arranged above the cut or cuts, and adapted to elevate and drop the malt, the air from the cut or cuts filling the space beneath the plow or plows and passing through the descending wall of malt, substantially as set forth.

2. In an apparatus for malting grain, the combination, of a malting floor, a traveling malt stirring and aerating machine having a rotary air shaft tubular throughout its length, said shaft having its lower edge cut out at diametrically opposite points circumferentially, each cut curving upward from an initial point to a bend and then downward to a terminal point, and malt stirring plows for each opening in a shaft, said plows projecting laterally from the bordering edges of the opening to approximately the bends of said edges, and the plows upon one shaft arranged at intersecting inclined planes, and the sets of plows upon contiguous shafts oppositely arranged, so that the highest point upon one will, during rotation, pass over the lowest point of the other, whereby the air passing out of the lower rod of the shaft will pass through the descending wall of grain from the plows substantially as set forth.

3. In an apparatus for malting grain, the combination, of an air receiving cylinder, rotatable cylinders communicating therewith and provided upon their lower ends with malt stirring plows, said cylinders arranged in sets and each provided with a worm gear, and an operating shaft between the sets of rotating cylinders or air shafts, provided with worms arranged oppositely or right and left, and each worm engaging a set of worm gears, whereby the air shafts composing a set are rotated in opposite directions to each other and in opposite directions to each of the contiguous shafts of a set, substantially as set forth.

4. In an apparatus for malting grain, the combination of an air receiving cylinder, rotatable cylinders communicating therewith, said cylinders arranged in sets and each provided with a worm gear, the forward cylinders of the outer sets upon one side also provided each with a worm, an operating shaft arranged between the sets of rotating cylinders or air shafts and provided with worms, each worm engaging a set of worm gears upon the air cylinders, a second shaft provided near one end with worm gears engaging the worms of the outer forward air cylinders or shafts, and also provided upon opposite ends with wheels, and a trackway upon which said wheels travel, substantially as set forth.

5. In an apparatus for malting grain, the combintion, of an air receiving cylinder, rotatable cylinders communicating therewith, said cylinders arranged in sets and each provided with a worm gear, the forward cylinders of the outer sets upon one side also provided each with a worm, an operating shaft between the sets of rotatable cylinders or air shafts, provided with worms arranged oppositely or right and left, each worm engaging a set of worm gears upon the air cylinders, a trackway, a second shaft provided upon opposite ends with wheels adapted to travel on the trackway, and also carrying collars loosely near one end, each collar having formed rigidly therewith a worm wheel meshing with the corresponding worm of the air cylinder and formed upon one end into a clutch, and a collar splined or feathered upon the shaft intermediate the loose collars, said collar having its opposite ends formed into clutches, adapted to be thrown into engagement with either of said loose collars, substantially as set forth.

6. In an apparatus for malting grain, the combination of an air receiving cylinder, rotatable cylinders communicating therewith, said cylinders arranged in sets and each provided with a worm gear, the forward cylinders of the outer sets upon one side also provided each with a worm gear, an operating shaft between the sets of rotating cylinders or air shafts provided with worms arranged oppositely or right and left, each worm engaging a set of worm gears upon the air cylinders, a trackway, a second shaft provided upon opposite ends with wheels adapted to travel on the trackway, and also carrying loosely collars near one end, each of said collars carrying rigidly a worm wheel meshing with the corresponding worm of the air cylinder and formed upon one end into a clutch, a collar splined or feathered upon the shaft, said collar having its opposite ends formed into clutches adapted to be thrown into engagement with either of the loose collars, a hinged or pivoted lever engaging medially the splined or feathered collar, and inclined or beveled lugs arranged, respectively, to be engaged by the opposite ends of the hinged or pivoted lever at the limit of the forward and backward travel of the machine, and constructed, when thus engaged, to throw the splined or feathered collar to an intermediate position out of engagement with either of the clutches of the loose collars, substantially as set forth.

7. In an apparatus, for malting grain, the combination, of an air receiving cylinder provided with depending supplemental pipes or cylinders, air shafts or cylinders extending into the depending pipes and rotatable therein, said shafts or cylinders carrying malt stirring mechanism, and brass rings or bushings interposed between the depending pipes and the air shafts or cylinders and provided at their lower ends with angular annular flanges passing beneath the lower edges of the depending pipes, substantially as set forth.

8. In an apparatus for malting grain, the combination, of an air receiving cylinder provided with depending supplemental pipes or cylinders, air shafts or cylinders extending into the depending pipes and provided with worm gears, bearings for the rotatable cylinders or air shafts, each formed upon its upper side with a cavity in which the hub of the worm gear is seated and the shaft thus supported, and an operating shaft carrying worms, each worm meshing with a set of the worm gears, substantially as set forth.

9. In an apparatus for malting grain, the combination of an air receiving cylinder, provided with depending supplemental pipes or cylinders, air shafts or cylinders extending into the depending pipes and provided with worm gears and also formed medially with oil cups or receptacles, upper bearings for the rotatable cylinders or air shafts, each formed upon its upper side with a cavity forming an oil receptacle, a lower bearing arranged immediately above the medial oil cup or receptacle, and an operating shaft carrying worms, each worm meshing with a set of the worm gears, substantially as set forth.

10. In an apparatus for malting grain, the combination, with a double trackway comprising an outer rack and an inner track, of a rotatable shaft carrying upon each end an outer pinion having an inwardly extending hub upon which is loosely and freely mounted a wheel, said pinion engaging the rack and the wheel the track, the teeth of the rack extending sufficiently higher than the plane of the track to bring the initial contact of the engaging point of the tooth of the wheel on a line with the upper edge of the track, whereby practically a uniform movement of the two wheels is attained and malt stirring plows actuated by the rotatable shaft, substantially as set forth.

11. In an apparatus for malting grain, the combination of a traveling carriage provided with an air receiving cylinder or drum, a rotatable tubular cylinder communicating with the air receiving cylinder or drum and provided at its lower end with malt stirring mechanism; and a telescoping air cylinder leading thereto, constructed to be extended as the carriage travels forward and to be operated upon reversely as the carriage travels rearward, substantially as set forth.

12. In an apparatus for malting grain, the combination, of a traveling carriage provided with an air receiving cylinder or drum, a rotatable tubular cylinder communicating with the air receiving cylinder or drum, and provided at its lower end with malt stirring mechanism, and a telescoping air cylinder leading thereto, each of the sections composing this cylinder connected with the next of the series by a normally slack rope or cable, substantially as set forth.

13. In an apparatus for malting grain, the combination, of a traveling carriage provided with an air receiving cylinder or drum, a rotatable tubular cylinder communicating with the air receiving cylinder or drum, and provided at its lower end with malt stirring mechanism a telescoping air cylinder leading thereto, a trackway, and an arm connected with each section carrying at its upper end a roller constructed to travel on the trackway, substantially as set forth.

14. In an apparatus for malting grain, the combination of a traveling carriage provided with an air receiving cylinder or drum, a rotatable tubular cylinder communicating with the air receiving cylinder or drum, and provided at its lower end with malt stirring mechanism a telescoping air cylinder leading thereto, an annular band for each section provided with an angular annular extension or flange, and a rubber disk secured to each flange having a central aperture through which each section passes, substantially as set forth.

In testimony whereof I affix my signature in presence of two witnesses.

JOHN F. DORNFELD.

Witnesses:
ARTHUR L. MORSELL,
C. T. BENEDICT.